Patented Feb. 11, 1930

1,746,506

UNITED STATES PATENT OFFICE

ROGER WILLIAMS, OF WILMINGTON, DELAWARE, ASSIGNOR TO DU PONT AMMONIA CORPORATION, OF WILMINGTON, DELAWARE, A CORPORATION OF DELAWARE

PROCESS FOR THE PREPARATION OF PHOSGENE

No Drawing. Application filed October 4, 1927. Serial No. 224,023.

This invention relates to the manufacture of phosgene.

I have discovered that phosgene can be produced by the reaction of carbon monoxide with nitrosyl chloride, NOCl. The process is carried out by submitting a gaseous mixture of carbon monoxide and nitrosyl chloride to the action of a catalyst, for which purpose I prefer to employ activated carbon. The reaction proceeds to some extent at ordinary temperatures, but for practical results I prefer to employ temperatures within the range of 100° to 250° C. The use of too high temperatures is to be avoided, however, on account of danger of decomposition of phosgene.

The following example is illustrative of the method of carrying out the invention:

A gaseous mixture of carbon monoxide and nitrosyl chloride suitable for the purpose may be prepared by saturating dry gaseous carbon monoxide by passage through a body of liquid nitrosyl chloride contained in a glass vessel which is maintained at a low temperature by immersion in boiling liquid ammonia. The gaseous mixture thus prepared (containing about 40% by volume of nitrosyl chloride and 60% of carbon monoxide) is passed directly through a glass tube containing about 15 cc. of catalyst and disposed within an electric furnace adapted for maintaining the reaction apparatus at a suitable temperature. The catalyst employed consists of activated carbon in the form of gas mask charcoal of the quality known as "75-minute" and reduced to a particle size of eight to fourteen mesh. With the electric furnace adjusted so that the initial temperature of the catalyst is about 145°, the reaction is commenced by passing over the catalyst a gaseous mixture produced by causing carbon monoxide to flow through the liquid nitrosyl chloride at the rate of about 90 cc. per minute. After the reaction has gotten under way the flow of carbon monoxide may be increased to about 135 cc. per minute while the temperature is maintained at about 150° C. The gases issuing from the tube in which the catalyst is disposed are conducted through a condenser cooled with a mixture of carbon dioxide snow and alcohol. In the receiver connected to this condenser a liquid, reddish in color, is collected. This consists principally of liquid phosgene together with some unconverted nitrosyl chloride from which the phosgene may be separated by fractional distillation or by chemical methods, as may be desired. The uncondensed gases issuing from the receiver consist primarily of nitric oxide which is one of the products of the reaction of nitrosyl chloride and carbon monoxide. This nitric oxide may be recovered and utilized, for example, by oxidation and conversion to nitric acid.

In carrying out the present process on a commercial scale it is advantageous to employ a gaseous mixture of reactants in which the proportion of nitrosyl chloride is about equal to or greater than that theoretically required for the reaction. Under these conditions the reaction can readily be carried out so that the products of the reaction contain little or no carbon monoxide. The nitric oxide formed can then readily be separated by condensing the phosgene and any unconverted nitrosyl chloride. The last named substances may be separated from one another by fractional distillation and the nitrosyl chloride thus recovered may be again employed in the process. This method of carrying out the reaction is to be recommended because of the economies in raw materials effected thereby, as well as the great readiness with which the by-product nitric oxide may be recovered.

The mixture of carbon monoxide and nitrosyl chloride may be prepared in various ways in addition to the one above indicated. Thus carbon monoxide may be mixed with gaseous nitrosyl chloride obtained by boiling the liquid or coming directly from the process in which it was produced.

For the best results it is important that dry carbon monoxide be used in the process and that other suitable precautions be taken to avoid the presence of water in the gaseous mixture that is to react, since the presence of water will result in the decomposition of nitrosyl chloride.

Various changes may be made in the method described without departing from the invention or sacrificing any of the advantages thereof.

I claim:

1. The process of producing phosgene by the reaction of carbon monoxide and nitrosyl chloride.

2. The process of producing phosgene by submitting a gaseous mixture of carbon monoxide and nitrosyl chloride to the action of a catalyst.

3. The process of producing phosgene which comprises passing a gaseous mixture of carbon monoxide and nitrosyl chloride over a catalyst.

4. The process of producing phosgene which comprises passing a gaseous mixture of carbon monoxide and nitrosyl chloride over activated carbon.

5. The process of producing phosgene which comprises passing a gaseous mixture of carbon monoxide and nitrosyl chloride over activated carbon at a temperature within the range of 100 to 250° C.

6. The process of producing phosgene which comprises passing a gaseous mixture of carbon monoxide and nitrosyl chloride over a catalyst at a temperature within the range of 100 to 250° C.

In testimony whereof I affix my signature.

ROGER WILLIAMS.